United States Patent
Osborne et al.

(10) Patent No.: US 7,207,581 B2
(45) Date of Patent: Apr. 24, 2007

(54) ADJUSTABLE HYDROSTATIC CONTROL SYSTEM

(75) Inventors: Donald L. Osborne, Quarryville, PA (US); Kenneth W. McLean, New Holland, PA (US); Douglas R. Otto, New Holland, PA (US); Dennis L. Coates, Kinzer, PA (US)

(73) Assignee: CNH America LLC, New Holland, PA (US)

( * ) Notice: Subject to any disclaimer, the term of this patent is extended or adjusted under 35 U.S.C. 154(b) by 435 days.

(21) Appl. No.: 10/966,284

(22) Filed: Oct. 15, 2004

(65) Prior Publication Data
US 2006/0082118 A1    Apr. 20, 2006

(51) Int. Cl.
*B62D 7/16* (2006.01)
(52) U.S. Cl. .............. 280/93.502; 180/6.32; 180/6.3
(58) Field of Classification Search ......... 180/6.3, 180/6.32, 6.2, 6.44, 6.48, 307, 89.17; 280/771, 280/93.502; 74/496, 495
See application file for complete search history.

(56) References Cited

U.S. PATENT DOCUMENTS

| | | | |
|---|---|---|---|
| 650,516 A | 5/1900 | Lamielle et al. | 180/6.38 |
| 966,586 A | 9/1910 | Nordquist | 180/6.34 |
| 1,294,174 A | 2/1919 | Roze | 180/6.36 |
| 1,476,068 A | 12/1923 | Froelich | 180/6.34 |
| 3,494,449 A | 2/1970 | Umeda et al. | 192/13 |
| 3,897,840 A * | 8/1975 | Molzahn et al. | 180/6.48 |
| 4,790,399 A | 12/1988 | Middlesworth | 180/6.2 |
| 5,649,606 A * | 7/1997 | Bebernes et al. | 180/307 |
| 6,325,166 B1 | 12/2001 | Shimada et al. | 180/6.48 |
| 6,523,635 B1 | 2/2003 | Johnston et al. | 180/307 |
| 6,659,216 B2 | 12/2003 | Irikura et al. | 180/307 |
| 6,932,179 B2 * | 8/2005 | Sakikawa et al. | 180/242 |
| 7,133,758 B2 * | 11/2006 | Otto et al. | 701/50 |
| 2007/0024434 A1 * | 2/2007 | Chow et al. | 340/438 |

* cited by examiner

*Primary Examiner*—Paul N. Dickson
*Assistant Examiner*—Drew J. Brown
(74) *Attorney, Agent, or Firm*—Stephen A. Bucchianeri; John William Stader; Michael G. Harms

(57) ABSTRACT

An adjustable hydrostatic control system that adjusts in length to locate mutual neutral locations while transmitting the necessary torque through mating sliding spines.

16 Claims, 3 Drawing Sheets

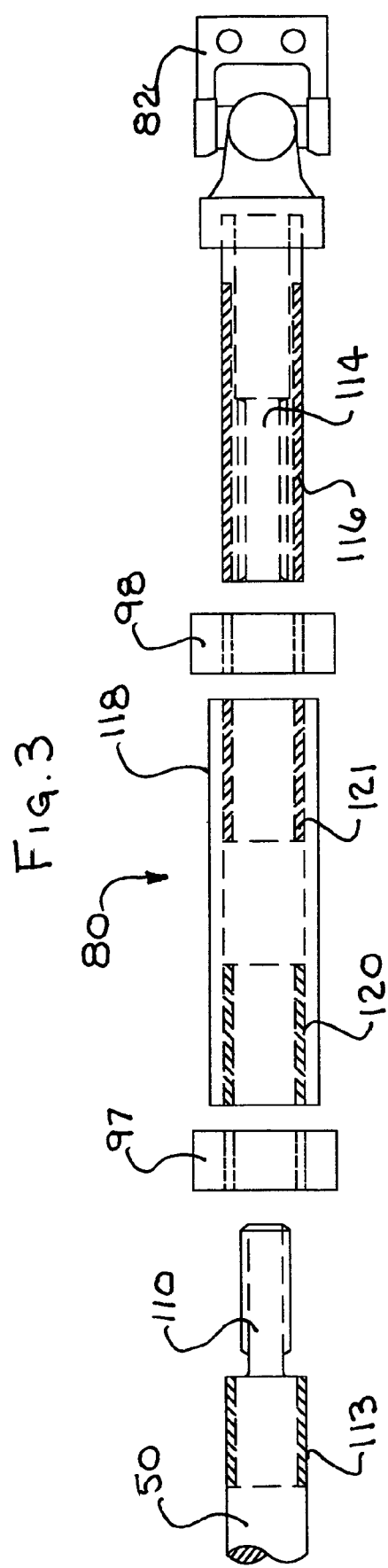
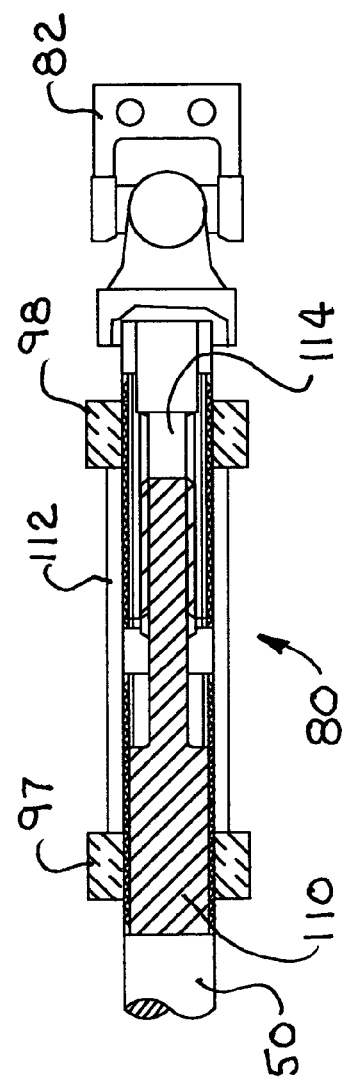

ADJUSTABLE HYDROSTATIC CONTROL SYSTEM

BACKGROUND OF THE INVENTION

The present invention relates generally to agricultural windrowers, and more particularly to an easily adjustable control system for the hydrostatic drive system of a self-propelled mower conditioner having ground drive wheels.

The general mode of operation of a modem windrower is to have tandem hydrostatic pumps, one for each of two drive wheels, each pump having a depending pintle arm such that forward and reverse movement of the pintle arm relative to a neutral position causes the associated hydrostatic pump, and thus the associated drive wheel, to rotate. During the original assembly of the windrower and during normal maintenance and repair operations in the life of the machine, the pintle arms must be adjusted to neutral. In the machine just described, the adjustment is made at a location under the cab, requiring disassembly of several other components to establish access.

It would be a distinct advantage to reduce the difficulty of making the neutral adjustment, while providing full operation of the steering control and speed of the hydrostatic drive system of the windrower.

SUMMARY OF THE INVENTION

Accordingly, it is an object of the present invention to provide a simple and convenient neutral adjustment mechanism for hydrostatic drive system of a windrower.

Another object of the present invention is to provide an adjustable steering control shaft for a windrower.

It is another object of the present invention to provide an adjustable and simple steering control shaft for the pintle arms of tandem hydrostatic pumps.

Yet another object of the present invention is to provide a telescoping splined steering control shaft that can be adjusted in length and still transmit the required torque through the splines.

Yet another object of the present invention is to provide a steering control shaft that can be adjusted in length without affecting the steering pto.

It is yet another object of the present invention to provide an adjustable steering control shaft that is durable in construction, inexpensive of manufacture, carefree of maintenance, facile in assemblage, and simple and effective in use.

It is a still further object of the present invention to provide an adjustable control system for the hydrostatic drive of a windrower.

These and other objects are attained by providing an adjustable hydrostatic control system that adjusts in length to locate mutual neutral locations while transmitting the necessary torque through mating sliding spines.

DESCRIPTION OF THE DRAWINGS

The advantages of this invention will be apparent upon consideration of the following detailed disclosure of the invention, especially when taken in conjunction with the accompanying drawings wherein:

FIG. 3 is a partial schematic exploded view of the length adjustment assembly of the instant invention; and FIG. 4 is a partial schematic view of the assembled adjustment assembly.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
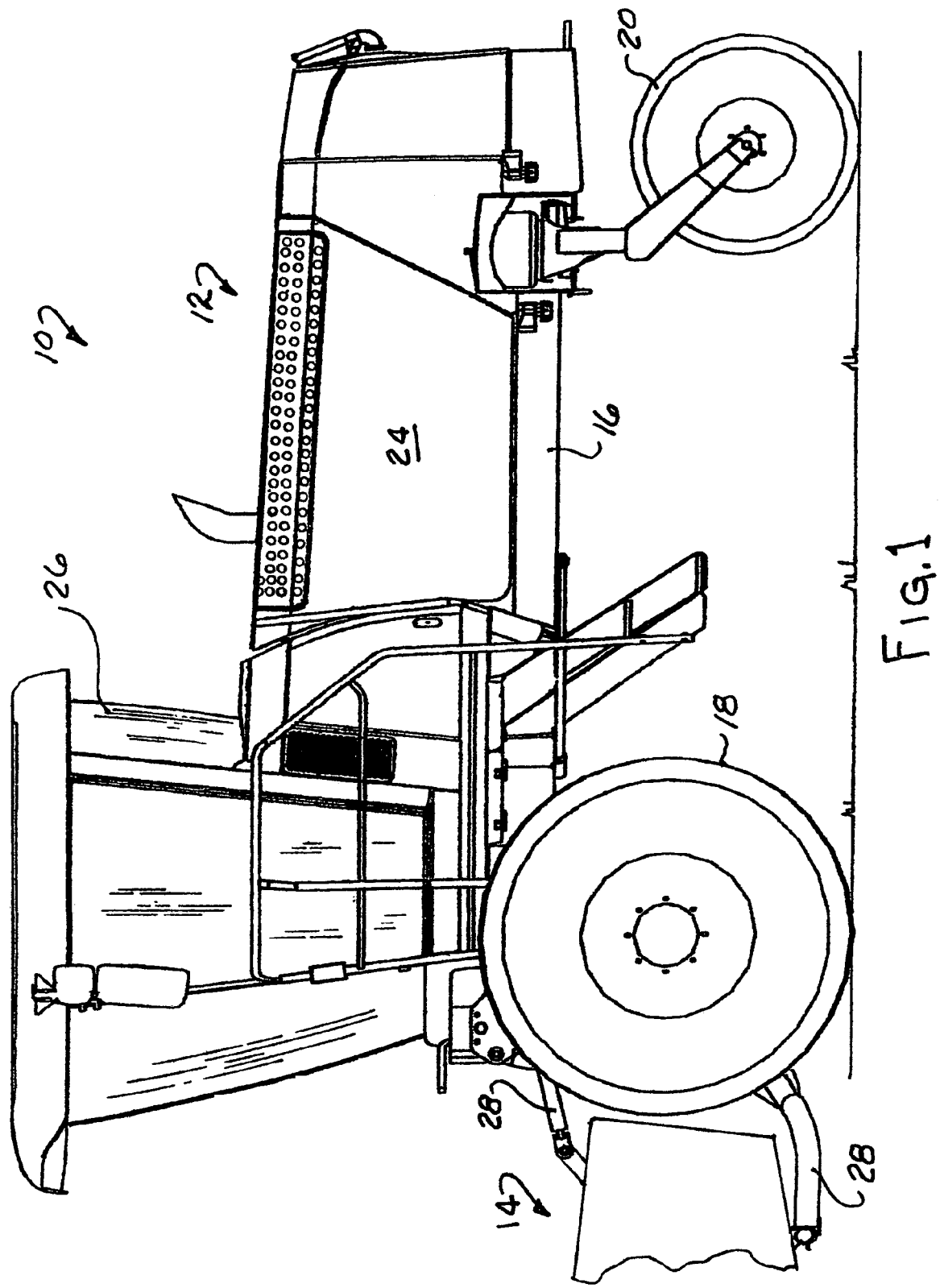
FIG. 1 is a side view of a windrower of the type with which the adjustable control system will prove advantageous.

FIG. 1 shows the two primary components of a self-propelled windrower 10, i.e., tractor 12 and header 14. Tractor 12 has a main frame 16, with a longitudinal horizontal axis from front to back, that is supported by a pair of drive wheels 18 (only one shown) on the forward portion thereof and a pair of rear wheels 20 adjacent the rear end. An engine, located under cowling 24, a transmission and other components, as will be discussed further below and generally well known in the art, are likewise supported on the main frame 16 and provide the power necessary for the machine to operate. A cab 26 encloses the operator's platform to provide an environmentally controlled location from which the windrower may be comfortably operated.

Header 14 may be of several designs, typically comprising a cutting mechanism, either a sicklebar or rotary cutter, a feeder mechanism and conditioning rolls. The header is supported by a hydraulic lift and flotation structure 28 that may be activated to selectively raise or lower the header between transport and operational positions.

Figure 2:
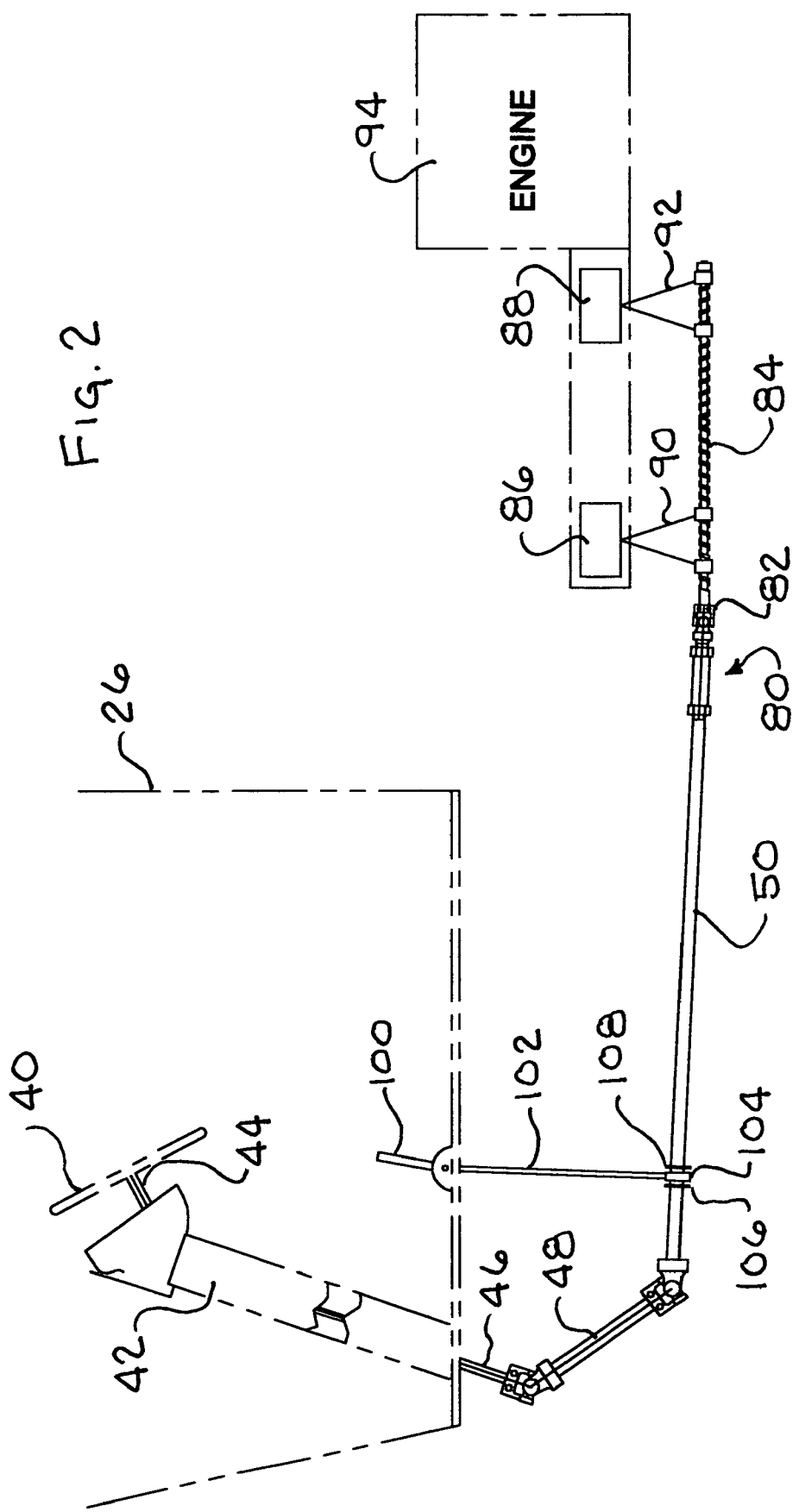
FIG. 2 is an partial left side view of the control system of the instant invention.

Referring now to FIG. 2, the hydrostatic control system is shown to include a conventional steering wheel 40 and console 42 inside the operator's cab 26. The cab would, of course, include additional components (not shown) such as a seat, electrical and mechanical controls for operation of the windrower, an air conditioning unit, and the like. The steering wheel is attached to a stub shaft 44 that is connected to the upper end of front shaft 46 by a universal connector (not shown). The universal connector is well known in the art as a mechanism to transmit rotational movement between two shafts that are not necessarily in axial alignment. The lower end of front shaft 46 is connected to elongate bottom shaft 50 by another universal connector, or power-take-off shaft, 48. As will be discussed further below, a length adjustment assembly 80 is attached to the rear most end of bottom shaft 50, at a location rearward of and below cab 26 in an accessible position.

Length adjustment assembly 80 is connected, by another universal connector 82, to elongate threaded rod-like member 84—one end with right-hand threads and the other with left-hand threads—, such that any turn of steering wheel 40 results in a proportional turn of member 84. Two tandem hydraulic pumps 86, 88 are located above member 84 and each has a pintle arm 90, 92, respectively, depending therefrom. Each pintle arm has an internally threaded block threaded onto member 84, such that rotation of the rod causes the pintle arm to move either forwardly or rearwardly, depending upon the direction of rotation of member 84. Thus, rotation of member 84 results in one pintle arm rotating in a clockwise direction and the other rotating in a counter-clockwise direction, when viewed from the side, as in FIG. 2. This causes one pump to increase flow and the other to decrease flow, turning the windrower. Engine 94 supplies power to the hydraulic pumps.

Within cab 26 is a forward-neutral-reverse lever 100. This is continuously and selectively movable to allow a change in speed in either the forward or reverse directions. The neutral position has either an indent or other mechanism to allow easy recognition by the operator. Lever 100 is intended to selectively move member 84 forwardly or rearwardly to simultaneously move both pintle arms an equal amount, thus allowing an equal increase or decrease in flow from the hydraulic pumps. In this embodiment, lever 100 moves the lower end of rigid connecting member 102 forwardly or rearwardly. A sliding connector 104 is affixed to the end of connecting member 102 and has an opening therein through which shaft 50 extends and rotates without interference. A pair of small plates 106, 102 are affixed to shaft 50, rotate therewith, and spaced very closely to connector 104, such that movement of connecting member 102 causes connector 104 to engage one or the other plates 106, 108 to move shaft 50 and member 84 forwardly or rearwardly to adjust the speed of the windrower.

FIG. 3 shows the length adjustment assembly 80 to be comprised of three basic components, a male spline shaft 100 affixed to the end portion of bottom shaft 50—shaft 50 including an outside threaded portion 113—, a female internally splined shaft 114—having an externally threaded portion 116—, and a tubular member 118 with internally threaded portions 120. 121. A universal connector 82 is affixed to the outer end of the female splined shaft 114 for connection to threaded shaft 84 to accommodate for a small amount of axial misalignment. FIG. 4 shows the assembled adjustment assembly 80 to include a pair of jam nuts 97, 98 one threaded onto the threaded portion 113 of male splined shaft 100 and the other threaded onto the threaded portion 116 of female splined shaft 114. To adjust the length of mechanism 80, i.e., the amount of insertion of the male splined shaft into the female splined shaft, the jam nuts 97, 98 are loosened and the splined shafts either rotated clockwise or counterclockwise to adjust the length of mechanism 80. When the desired length is obtained, the jam nuts 97, 98 are tightened against tubular member 118 to hold the components in a rigid unit.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. An agricultural windrower with a longitudinal axis extending between front and opposing rear ends, front and rear wheel pairs supporting a main frame, an operator's platform supported on said main frame generally adjacent said front end of the windrower, an engine and hydrostatic drive system supported by said main frame to supply motive power to said front wheel pair, said drive system including first and second hydrostatic pumps, one for driving each wheel of said front wheel pair, each said pump having a depending pintle arm selectively and continuously pivotable between forward, neutral and reverse positions, said pintle arms in generally the same vertical plane, said main frame adapted to support a removable crop-engaging header on said front end thereof, and an adjustable control system for said hydrostatic drive system comprising:

a steering wheel supported on said operator's platform generally above said front wheel pair and rotatable in first and second opposing directions, said steering wheel having a neutral alignment wherein said steering wheel is generally in parallel alignment with said longitudinal axis;

a first rotational motion transfer mechanism having first and second opposing ends, said first end of said first motion transfer mechanism connected to said steering wheel and said second end of said first motion transfer mechanism located generally behind said operator's platform, such that rotation of said steering wheel causes a generally equal amount of rotation of said second end of said first motion transfer mechanism;

a second motion transfer mechanism connected to said pintle arms such that rotation of said second motion transfer mechanism in said first direction pivots said pintle arms apart, and rotation in said second direction rotates said pintle arms together; and a length adjustment assembly interconnecting said second end of said first motion transfer mechanism and said second motion transfer mechanism, said length adjustment assembly adapted to permit adjustment of the position of said first motion transfer mechanism relative to said second motion transfer mechanism whereby said pintles may be located in said neutral position when said steering wheel is in said neutral alignment.

2. The windrower of claim 1, wherein:

said length adjustment assembly includes mating male and a female splined shafts, the splines of which are selectively slidingly movable relative to each other to vary the length thereof.

3. The windrower of claim 2, wherein:

the relationship between said male and female splined shafts may be fixed by first and second jam nuts.

4. The windrower of claim 1, wherein:

said second end of said first motion transfer mechanism having a first longitudinal axis and a generally tubular cross-section with a first externally threaded portion thereon and a rod-like male splined shaft with a longitudinal axis coextensive with said first longitudinal axis, said male splined shaft affixed to and extending away from said first external threaded portion;

said length adjustment assembly including:

a female splined shaft having first and second opposing ends and a second longitudinal axis and a generally tubular cross-section with a second externally threaded portion thereon;

an intermediate member having first and second opposing ends an a generally tubular cross-section, a first internally threaded portion adjacent said first end of said intermediate member and a second internally threaded portion adjacent said second end of said intermediate member, the threads on said internally threaded portions of said intermediate member opposite each other;

a first nut with internal threads threaded onto said first externally threaded portion on said second end of said first motion transfer mechanism;

a second nut with internal threads threaded onto said second externally threaded portion of said female shaft;

said first externally threaded portion on said second end of said first motion transfer mechanism also threaded into said first internally threaded portion of said intermediate member, and said second externally threaded portion of said female member is also threaded into said second internally threaded portion of said intermediate member, whereby said male and female splined shafts are in sliding engagement and the relationship between them may be adjusted by changing the amount of engagement of said first and second threaded portions of said intermediate member with said threaded portions of said male and female shaft members and locking them into place by tightening said first and second nuts into engagement with said intermediate member.

5. The windrower of claim 4, wherein:

said second motion transfer mechanism having a first end and an opposing second end, said first end of said second motion transfer mechanism connected to said second end of said female splined shaft.

6. The windrower of claim 5, wherein:

said second end of said female splined shaft is connected to said first end of said second motion transfer mechanism by a connector that permits a small amount of misalignment while still allowing rotational transfer between the connected components.

7. The windrower of claim 6, wherein:

said first and second motion transfer mechanisms and said length adjustment assembly are selectively and continuously movable forwardly and rearwardly in unison in a plane generally parallel to said longitudinal axis of the windrower;

a forward-neutral-reverse shifting mechanism on said operator's platform and connected to said first motion transfer mechanism to selectively adjust the speed and direction of travel of the windrower.

8. The windrower of claim 7, wherein:

said second motion transfer mechanism includes an elongate rod-like member with external right-hand on approximately one-half the length thereof and left-hand threads on the other half, and said first and second pintle arms each include a threaded member thereon threadably engaged with respective right and left-hand threads on said rod-like member.

9. An agricultural windrower with a longitudinal axis extending between front and opposing rear ends, front and rear wheel pairs supporting a main frame, an operator's platform supported on said main frame generally adjacent said front end of the windrower, an engine and hydrostatic drive system supported by said main frame to supply motive power to said front wheel pair, said drive system including first and second hydrostatic pumps, one for driving each wheel of said front wheel pair, each said pump having a depending pintle arm selectively and continuously pivotable between forward, neutral and reverse positions, said pintle arms in generally the same vertical plane, said main frame adapted to support a removable crop-engaging header on said front end thereof, and an adjustable control system for said hydrostatic drive system comprising:

a steering wheel supported on said operators platform generally above said front wheel pair and rotatable in first and second opposing directions, said steering wheel having a neutral alignment wherein said steering wheel is generally in parallel alignment with said longitudinal axis;

a first rotational motion transfer mechanism having first and second opposing ends, said first end of said first motion transfer mechanism connected to said steering wheel and said second end of said first motion transfer mechanism located generally behind said operator's platform, such that rotation of said steering wheel causes a generally equal amount of rotation of said second end of said first motion transfer mechanism;

a second motion transfer mechanism connected to said pintle arms such that rotation of said second motion transfer mechanism in said first direction pivots said pintle arms apart, and rotation in said second direction rotates said pintle arms together;

a length adjustment assembly interconnecting said second end of said first motion transfer mechanism and said second motion transfer mechanism, said length adjustment assembly adapted to permit adjustment of the position of said first motion transfer mechanism relative to said second motion transfer mechanism whereby said pintles may be located in said neutral position when said steering wheel is in said neutral alignment; and said length adjustment assembly further including mating male and a female splined shafts, the splines of which are selectively slidingly movable relative to each other to vary the length thereof.

10. The windrower of claim 9, wherein:

the relationship between said male and female splined shafts may be fixed by first and second jam nuts.

11. In an agricultural windrower with a longitudinal axis extending between front and opposing rear ends, front and rear wheel pairs supporting a main frame, an operator's platform supported on said main frame generally adjacent said front end of the windrower, an engine and hydrostatic drive system supported by said main frame to supply motive power to said front wheel pair, said drive system including first and second hydrostatic pumps, one for driving each wheel of said front wheel pair, each said pump having a depending pintle arm selectively and continuously pivotable between forward, neutral and reverse positions, said pintle arms in generally the same vertical plane, said main frame adapted to support a removable crop-engaging header on said front end thereof, and an adjustable control system for said hydrostatic drive system, the in said adjustment control system comprising:

a steering wheel supported on said operator's platform generally above said front wheel pair and rotatable in first and second opposing directions, said steering wheel having a neutral alignment wherein said steering wheel is generally in parallel alignment with said longitudinal axis;

a first rotational motion transfer mechanism having first and second opposing ends, said first end of said first motion transfer mechanism connected to said steering wheel and said second end of said first motion transfer mechanism located generally behind said operator's platform, such that rotation of said steering wheel causes a generally equal amount of rotation of said second end of said first motion transfer mechanism;

a second motion transfer mechanism connected to said pintle arms such that rotation of said second motion transfer mechanism in said first direction pivots said pintle arms apart, and rotation in said second direction rotates said pintle arms together; and a length adjustment assembly interconnecting said second end of said first motion transfer mechanism and said second motion transfer mechanism, said length adjustment assembly adapted to permit adjustment of the position of said first notion transfer mechanism relative to said second motion transfer mechanism whereby said pintles may be located in said neutral position when said steering wheel is in said neutral alignment.

12. The windrower of claim 11, wherein:

said second end of said first motion transfer mechanism having a first longitudinal axis and a generally tubular cross-section with a first externally threaded portion thereon and a rod-like male splined shaft with a longitudinal axis coextensive with said first longitudinal axis, said male splined shaft affixed to and extending away from said first external threaded portion;

said length adjustment assembly including:

a female splined shaft having first and second opposing ends and a second longitudinal axis and a generally tubular cross-section with a second externally threaded portion thereon;

an intermediate member having first and second opposing ends an a generally tubular cross-section, a first internally threaded portion adjacent said first end of said intermediate member and a second internally threaded portion adjacent said second end of said intermediate member, the threads on said internally threaded portions of said intermediate member opposite each other;

a first nut with internal threads threaded onto said first externally threaded portion on said second end of said first motion transfer mechanism;

a second nut with internal threads threaded onto said second externally threaded portion of said female shaft;

said first externally threaded portion on said second end of said first motion transfer mechanism also threaded into said first internally threaded portion of said intermediate member, and said second externally threaded portion of said female member is also threaded into said second internally threaded portion of said intermediate member, whereby said male and female splined shafts are in sliding engagement and the relationship between them may be adjusted by changing the amount of engagement of said first and second threaded portions of said intermediate member with said threaded portions of said male and female shaft members and locking them into place by tightening said first and second nuts into engagement with said intermediate member.

13. The windrower of claim 12, wherein:

said second motion transfer mechanism having a first end and an opposing second end, said first end of said second motion transfer mechanism connected to said second end of said female splined shaft.

14. The windrower of claim 13, wherein:

said second end of said female splined shaft is connected to said first end of said second motion transfer mechanism by a connector that permits a small amount of misalignment while still allowing rotational transfer between the connected components.

15. The windrower of claim 12, wherein:

said first and second motion transfer mechanisms and said length adjustment assembly are selectively and continuously movable forwardly and rearwardly in unison in a plane generally parallel to said longitudinal axis of the windrower;

a forward-neutral-reverse shifting mechanism on said operator's platform and connected to said first motion transfer mechanism to selectively adjust the speed and direction of travel of the windrower.

16. The windrower of claim 15, wherein:

said second motion transfer mechanism includes an elongate rod-like member with external right-hand on approximately one-half the length thereof and left-hand threads on the other half, and said first and second pintle arms each include a threaded member thereon threadably engaged with respective right and left-hand threads on said rod-like member.

\* \* \* \* \*